United States Patent Office 3,629,291
Patented Dec. 21, 1971

3,629,291
CYCLOHEXANE-1,2,3,4,5-PENTACARBOXYLIC
ACID AND ITS DIANHYDRIDE
Heinz Nohe, Ludwigshafen, Germany, assignor to
Badische Anilin- & Soda-Fabrik Aktiengesellschaft,
Ludwigshafen (Rhine), Germany
No Drawing. Filed June 18, 1969, Ser. No. 834,490
Claims priority, application Germany, June 25, 1968,
P 17 68 744.4
Int. Cl. C07c 61/08; C07d 5/32
U.S. Cl. 260—346.3                                    3 Claims

ABSTRACT OF THE DISCLOSURE

Cyclohexane-1,2,3,4,5-pentacarboxylic acid and its dianhydride are obtained by oxidation of bicyclo-[2,2,2]-oct-7-ene-2,3,5-tricarboxylic acid and/or its anhydride with 10 to 100% by weight nitric acid in the presence of an oxidation catalyst at a temperature of from 30° to 300° C.

---

The present invention relates to new compounds, cyclohexane-1,2,3,4,5-pentacarboxylic acid and its dianhydride, and also to a process for the production of these compounds.

The object of this invention is to provide new polycarboxylic acids to serve inter alia as starting materials for plasticizer esters.

We have found that cyclohexane-1,2,3,4,5-pentacarboxylic acid or its dianhydride can be prepared in a simple manner by oxidizing bicyclo-[2,2,2]-oct-7-ene-2,3,5-tricarboxylic acid and/or its anhydride with from 10 to 100% by weight nitric acid in the presence of an oxidation catalyst at a temperature of from 30° to 300° C. and if desired converting the resultant cyclohexane-1,2,3,4,5-pentacarboxylic acid by a known method into the dianhydride.

It is known from U.S. patent specification No. 3,242,-206 and from Liebigs Annalen der Chemie, 611, 7 (1958), that bicycloheptene and bicyclooctene dicarboxylic acid derivatives can be oxidized to the corresponding tetracarboxylic acids by the action of concentrated nitric acid under drastic conditions. A catalyst is not necessary in these reactions. It is surprising that the action of nitric acid on bicyclo-[2,2,2]-oct-7-ene-2,3,5-tricarboxylic acid does not effect oxidation to cyclohexane-1,2,3,4,5-pentacarboxylic acid. It is only in the presence of a catalyst that the reaction results in the formation of the pentacarboxylic acid. In the absence of a catalyst (even under drastic conditions) the oxidation of the endoethylene bridge remains at the stage of the aldehyde which may be isolated in a high yield.

Cyclohexane-1,2,3,4,5-pentacarboxylic acid is obtained in almost quantitative yield by the process according to this invention.

The starting material for the process may be prepared in good yields by a Diels-Alder reaction of acrylic acid with cyclohexa-3,5-diene-1,2-dicarboxylic acid which is obtainable by partial hydrogenation of o-phthalic acid. The tricarboxylic acid or the anhydride is obtained depending on reaction conditions and processing method.

Oxidation is carried out in the presence of a conventional oxidation catalyst, for example, an organic or particularly an inorganic compound of palladium, molybdenum and preferably vanadium. The stage of oxidation of the active metal in the compounds used is not critical, nor is the type of counterion to the ion containing the active metal. For example the following specific compounds are suitable: sodium molybdate, potassium molybdate, ammonium molybdate, sodium vanadate, potassium vanadate, ammonium vanadate, vanadium pentoxide and palladium chloride. The catalyst is advantageously used in an amount of from 0.05 to 1% by weight.

Temperatures of from 30° to 300° C. are used for the process. Oxidation may be carried out at atmospheric pressure, advantageously at temperatures of from 50° to 100° C. The reaction may however be carried out at superatmospheric pressure, advantageously at pressures of up to 100 atmospheres, preferably at pressures of from 10 to 60 atmospheres. In this method, temperatures of up to 300° C. may be used so that residence times of a few seconds can be achieved. It is preferred to use temperatures of from 150° to 260° C. when using superatmospheric pressure.

The concentration of the nitric acid is generally from 10 to 100% by weight, nitric acid concentrations of from 30 to 80% by weight being preferred when using atmospheric pressure and concentrations of from 10 to 50% by weight being preferred when using superatmospheric pressure.

It is advantageous to use from 2 to 7 moles, preferably from 3 to 6 moles, of nitric acid for the oxidation of 1 mole of starting material. A greater excess of nitric acid is not however detrimental.

The reaction of the process according to the invention requires from a few seconds to about twenty hours depending on the temperature, pressure and nitric acid concentration. The optimum combination of temperature, nitric acid concentration and reaction period may easily be determined by preliminary experiments. The reaction may be carried out in batches or continuously. Batchwise reaction may be carried out for example by introducing the starting material in portions into nitric acid (containing the catalyst dissolved therein) while stirring at the reaction temperature, the deposited cyclohexanepentacarboxylic acid being filtered off after cooling. The process may be carried out continuously by supplying starting material and highly concentrated nitric acid continuously to the first reaction vessel of a cascade so that a specific nitric acid concentration is maintained in the reaction vessels. Cyclohexanepentacarboxylic acid formed is continuously withdrawn from the last reaction vessel of the cascade and filtered off. The filtrate is advantageously returned continuously to the first reaction vessel. Instead of carrying out the reaction in a cascade of stirred reactors, it may be carried out continuously in a reaction tube, and very short residence periods can be achieved by using high temperatures.

Cyclohexane-1,2,3,4,5-pentacarboxylic acid may be converted into its dianhydride by a conventional method, for example by heating with acetic anhydride. The original pentacarboxylic acid may be recovered from the dianhydride by hydrolysis.

Cyclohexane-1,2,3,4,5-pentacarboxylic acid and its anhydride give valuable plasticizers, for example as esters with specific alcohols, and they are distinguished by especially low volatility, particularly when used in polyvinyl chloride.

The invention is illustrated by the following examples. The parts given in the examples are parts by weight.

EXAMPLE 1

222 parts of bicyclo-[2,2,2]-oct-7-ene-2,3,5-tricarboxylic anhydride is cautiously added in fifteen minutes to a mixture of 470 parts of 68% by weight nitric acid and 0.5 part of ammonium vanadate which has been heated to 70° to 80° C. The temperature is kept at 80° C. by means of a waterbath during the addition. The reaction mixture is stirred for two and a half hours at 80° C., oxides of nitrogen being evolved. Then the reaction mixture is cooled to 5° C. and the precipitate which is deposited is suction filtered. The filtrate is carefully concentrated in vacuo and a second fraction of crystals is isolated. The collected precipitates are washed with glacial acetic acid and dried. 300 parts (98.6% of the theory) of cyclohexane-1,2,3,4,5-pentacarboxylic acid having a melting point of from 223° to 227° C. is obtained. The nuclear resonance spectrum exhibits a multiplet with maxima at 3.41, 3.05, 2.6 and 2.1 p.p.m.

304 parts of cyclohexane-1,2,3,4,5-pentacarboxylic acid is heated with 408 parts of acetic anhydride for two hours under reflux and then concentrated to half its volume. The precipitate formed is suction filtered, washed with a little cold acetic anhydride and dried. 238 parts of cyclohexane - 1,2,3,4,5 - pentacarboxylic dianhydride having a melting point of from 245° to 247° C. is obtained, i.e. 88% of the theory.

152 parts of cyclohexane-1,2,3,4,5-pentacarboxylic acid is heated for twelve hours with 450 parts of concentrated hydrochloric acid in an autoclave at 170° C. The reaction mixture is then concentrated to half its volume and cooled and the deposited precipitate is suction filtered and dried. The filtrate is evaporated to dryness in order to isolate the remainder of the rearrangement product. 141 parts of a rearranged cyclohexane-1,2,3,4,5-pentacarboxylic acid having a melting point of from 236° to 238° C. is obtained whose nuclear resonance spectrum exhibits a singlet at 2.55 p.p.m.

EXAMPLE 2

The procedure of Example 1 is followed but 800 parts of 40% by weight nitric acid is used and the reaction mixture is kept for eight hours at 70° C. 297 parts of cyclohexane-1,2,3,4,5-pentacarboxylic acid (97.5% of the theory) is obtained.

EXAMPLE 3

The procedure of Example 1 is followed but 1 part of ammonium molybdate is used as catalyst. 246 parts (81% of the theory) of cyclohexane-1,2,3,4,5-pentacarboxylic acid is obtained.

I claim:
1. Cyclohexane-1,2,3,4,5-pentacarboxylic acid.
2. A dianhydride of cyclohexane-1,2,3,4,5-pentacarboxylic acid obtained by heating cyclohexane-1,2,3,4,5-pentacarboxylic acid with acetic anhydride.
3. A process for the production of cyclohexane-1,2,3,4,5-pentacarboxylic acid wherein bicyclo-[2,2,2]-oct-7-ene-2,3,5-tricarboxylic acid and/or its anhydride is oxidized with from 10 to 100% by weight nitric acid in the presence of an oxidation catalyst at a temperature of from 30° to 300° C., said oxidation catalyst being an organic or an inorganic compound of palladium, molybdenum or vanadium.

References Cited

Eberson, L., Chemical Abstracts (1959), col. 18858–9.

ALEX MAZEL, Primary Examiner
B. DENTZ, Assistant Examiner

U.S. Cl. X.R.

260—31.8, 46.8, 345.2, 514